(No Model.)
L. B. MILLER.
DRAFT EQUALIZER.
No. 475,133. Patented May 17, 1892.
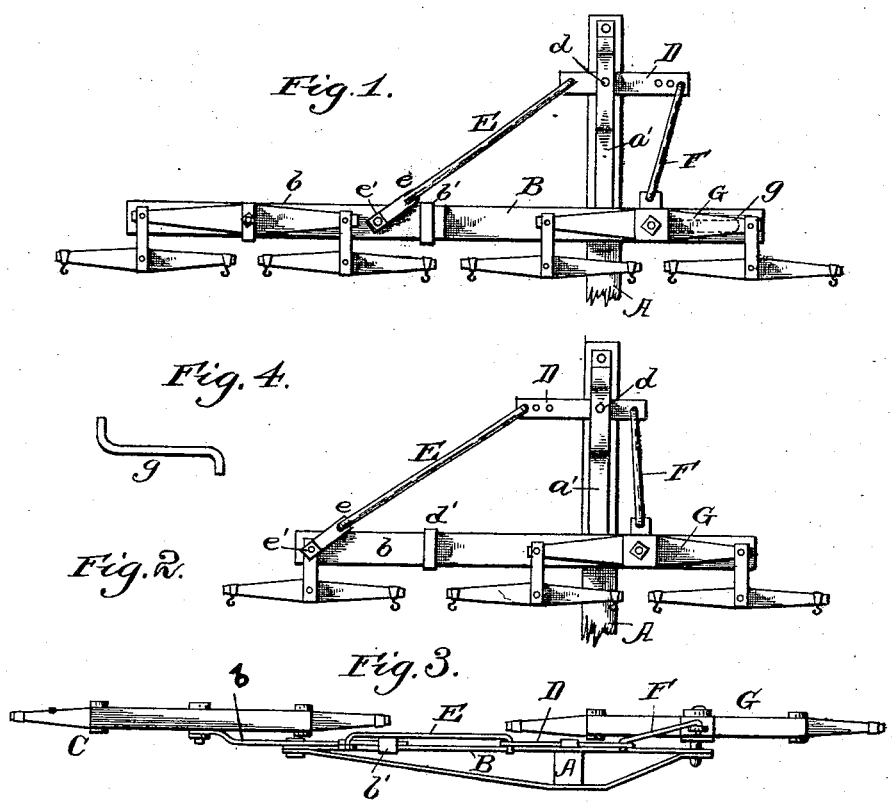
Witnesses:
J. B. McGirr.
William O. Belt.
Inventor:
Lawrence B. Miller,
By his Attorneys,
Edwin Bro's

United States Patent Office.

LAWRENCE B. MILLER, OF ENTERPRISE, ASSIGNOR OF ONE-HALF TO T. M. JONES, OF ABILENE, KANSAS.

DRAFT-EQUALIZER.

SPECIFICATION forming part of Letters Patent No. 475,133, dated May 17, 1892.

Application filed December 2, 1891. Serial No. 413,799. (No model.)

*To all whom it may concern:*

Be it known that I, LAWRENCE B. MILLER, a citizen of the United States, residing at Enterprise, in the county of Dickinson and State of Kansas, have invented certain new and useful Improvements in Draft-Equalizers; and I do hereby declare the following to be a full, clear, and exact description of the invention, such as will enable others skilled in the art to which it appertains to make and use the same.

My invention relates to improvements in draft-equalizers, and the object is to provide an improved arrangement of devices whereby the draft of four horses can be perfectly equalized; and a further object is to provide a device which can be easily and quickly adapted for three or four horses, as desired.

With these ends in view my invention contemplates pivotally securing on the tongue a long draft-lever, which carries the doubletrees and extends a greater distance on one side of the tongue than on the other. The longer arm is divided and clamped together, so that the length thereof may be readily adjusted, as desired, when three or four horses are employed. In rear of this draft-lever the main lever is pivoted on the tongue, and it also has a long and short arm, which extend in opposite directions to the respective arms of the draft-lever. The short arm of this main lever is loosely connected by a rod to a swivel on the long arm of the draft-lever, and the short arm of said main lever is also loosely connected by a rod to the doubletree of the pole-horses. This doubletree is pivotally supported on a crank-bar, which is pivoted in the end of the short arm of the draft-lever, and by this peculiar arrangement the pole-horses are harnessed on both sides of the tongue when four horses are employed. When it is desired to use but three horses, the doubletree on the end of the long arm of the draft-lever is removed and the short piece on the end of said lever is adjusted on the long arm of the draft-lever to shorten the same. A singletree is attached to the draft-lever by a bolt, which passes through a U-shaped strap on the singletree and the two sections of the draft-lever at the swivel thereon.

My invention consists, further, of certain details of construction and arrangement of parts, as will more fully appear hereinafter.

To enable others to more readily understand my invention, I have illustrated the same in the accompanying drawings, in which—

Figure I is a top plan view of the equalizer adapted for four horses. Fig. II is a similar view showing the equalizer adapted and arranged for three horses. Fig. III is a rear end view of Fig. I. Fig. IV is a detail view of the crank-bar.

Referring to the drawings, in which like letters of reference denote corresponding parts in all the figures, A designates the tongue, and B the draft-lever, which is pivoted thereon in the usual position by a bolt $a$. This draft-lever is eccentrically pivoted on the tongue and the longer arm is composed of two pieces, one of which $b$ is secured to the main piece by bolts and a keeper $b'$, and it can be suitably adjusted on the main portion to shorten or lengthen this end of the draft-lever. A doubletree C, carrying the usual singletrees, is pivotally secured on the outer end of the draft-lever, and it may be adjusted by means of bolt-holes provided in the lever for that purpose. In rear of the draft-lever the main lever D is eccentrically pivoted on the tongue at $d$, and a metal strip $a'$ is fastened on the tongue over the draft and main levers, and it has suitable bends in it over each lever to permit the latter to oscillate in their proper direction. As before stated, the main lever is also eccentrically pivoted on the tongue, and its long arm and short arm extend farther on opposite sides of the tongue than the respective arms of the draft-lever. The short arm of the main lever is loosely connected to the long arm of the draft-lever by a rod E and swivel $e$. The swivel is pivoted on the long arm by a bolt $e'$, passing through both pieces thereof, and it is so constructed that it will operate when extending at right angles to the draft-lever or at more acute angles thereto with equal efficiency. The long arm of the main lever is loosely connected by a rod F to the pole-doubletree G, and a number of holes are provided in the lever, whereby the rod may be adjustably secured thereto. This pole-doubletree is pivotally supported on a crank-bar $g$, the ends of which are turned at an angle to the bar and constitute the pivots for the doubletree on said arm and the arm on the short end of the draft-lever. By this construction and arrangement of parts the pole-doubletree will be so pivoted and secured that the singletrees carried thereby will be on either side of the tongue, and this will provide one horse on the left side of the tongue and three on the other side. The doubletrees and singletrees of the equalizer will keep their respective positions when in use, as the different parts and connections are so proportioned that any unequal draft is easily and readily equalized.

This improved equalizer may be used more especially on harvesting-machines of any description, and can also be readily adapted to heavy plows, wagons, &c., without having any side-draft. The draft-lever is braced by a suitable brace-bar H, which is secured beneath the tongue.

The operation of changing the equalizer to adapt it for three horses may be described as follows: The doubletree on short piece $b$ of long arm of draft-lever is removed and substituted by a singletree, and this is done by removing a bolt $e'$ out of swivel and sliding the short piece on the draft-lever in on the long arm thereof to a suitable position, where the holes on each piece will register in order that bolts will pass through both pieces. The swivel $e$ is moved to the second hole from the end of the short piece $b$, so that the bolt $e'$ will pass through the swivel and the short piece, and the singletree is attached to the draft-lever by a U-shaped strap L on said singletree, the ends of which pass above and below the draft-lever, respectively, and are secured thereto by the bolt $e'$, which passes through the ends of said strap, the swivel $e$, and the two sections of the draft-lever. Then the main lever D is reversed and attached to the tongue through the same hole as when used for four horses and the rods E F are properly adjusted.

It has been found that the equalizer may be used to provide one horse on the left-hand side and two on the right side of the tongue; but if a machine requires one on the right side and two on the left side the equalizer can be readily reversed and adjusted for this purpose.

If it should be desired to use three horses on the left and one on the right side of the tongue, the change may be readily made in the following manner: The rods E F, pole doubletree G, and bolts $d$ $a$, connecting the main and draft levers to the tongue, are removed, and after taking out the bolt $e'$ these two levers are both reversed. The bolts are then replaced in the same holes and the swivel, doubletrees, and rods are all replaced in their respective places.

Having thus fully described my invention, what I claim as new, and desire to secure by Letters Patent, is—

1. The combination, with a tongue, of a draft-lever B, eccentrically pivoted thereon and carrying the doubletrees, the main lever D, eccentrically pivoted on the tongue in rear of the draft-lever, the swivel $e$, carried by the long arm of the draft-lever between the fulcrum of the lever and the doubletree on the long arm thereof, the rod E, connecting the short arm of the main lever to said swivel, the crank-bar $g$, pivoted at one end on the short arm of the draft-lever and carrying a doubletree G at its other end, whereby the singletrees attached to said doubletree are on opposite sides of the tongue, and the rod F, connecting the doubletree with the short arm of the main lever, substantially as described.

2. The combination, with a tongue, of an extensible draft-lever eccentrically pivoted thereon and having its piece $b$ adjustably secured on the long arm of said lever by the keeper $b'$, which fits snugly over the inner end of the adjustable piece $b$ to rigidly hold the same, the main lever having a long and a short arm, the rod E, connecting the short arm of the main lever and the long arm of the draft-lever, the crank-bar $g$, pivoted at one end on the short arm of the draft-lever and carrying a doubletree G on its other end, and the rod F, connecting said doubletree and the long arm of the main lever, substantially as described.

In testimony whereof I affix my signature in presence of two witnesses.

LAWRENCE B. MILLER.

Witnesses:
H. G. FISHER,
WILLIAM O. BELT.